(12) United States Patent
Asakura et al.

(10) Patent No.: US 8,727,936 B2
(45) Date of Patent: May 20, 2014

(54) ROTARY CONNECTOR

(75) Inventors: Toshiaki Asakura, Miyagi-ken (JP);
Seishi Takahashi, Miyagi-ken (JP);
Yasuhisa Osumi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 246 days.

(21) Appl. No.: 13/420,089

(22) Filed: Mar. 14, 2012

(65) Prior Publication Data

US 2012/0237286 A1 Sep. 20, 2012

(30) Foreign Application Priority Data

Mar. 15, 2011 (JP) .................................. 2011-056972

(51) Int. Cl.
*F16H 57/08* (2006.01)

(52) U.S. Cl.
USPC .............................. 475/347; 439/15; 439/164

(58) Field of Classification Search
USPC ................... 439/15, 164; 475/331, 346, 347; 74/410, 411
See application file for complete search history.

(56) References Cited

U.S. PATENT DOCUMENTS

| 3,021,731 | A | * | 2/1962 | Stoeckicht | 475/344 |
| 5,653,604 | A | * | 8/1997 | Sakakibara | 439/164 |
| 5,655,919 | A | * | 8/1997 | Ishikawa et al. | 439/164 |
| 5,928,018 | A | * | 7/1999 | Dumoulin | 439/164 |

FOREIGN PATENT DOCUMENTS

| EP | 0829931 A1 | 3/1998 |
| JP | 06-50283 | 7/1994 |

OTHER PUBLICATIONS

Extended European Search Report issued in corresponding European Patent Application No. 12157046.9, mailed Jun. 6, 2012.

* cited by examiner

*Primary Examiner* — Sherry Estremsky
(74) *Attorney, Agent, or Firm* — Brinks Gilson & Lione (57) ABSTRACT

A rotary connector includes a stationary housing that includes an outer cylindrical body, and a movable housing that is disposed coaxially with the stationary housing and includes an inner cylindrical body facing the outer cylindrical body. An annular space portion is formed between the inner and outer cylindrical bodies facing each other and flat cables are wound and received in the annular space portion. An internal gear is provided on the outer cylindrical body of the stationary housing. A sun gear is provided on the inner cylindrical body of the movable housing. A planetary gear, which meshes with both the sun gear and the internal gear and is movable along the inner surface of a bottom plate portion of the stationary housing, is provided between the sun gear and the internal gear. The planetary gear and the sun gear include a plurality of void portions in the circumferential direction.

5 Claims, 7 Drawing Sheets

ROTARY CONNECTOR

CLAIM OF PRIORITY

This application claims benefit of Japanese Patent Application No. 2011-056972 filed on Mar. 15, 2011, which is hereby incorporated by reference in its entirety.

BACKGROUND

1. Field of the Disclosure

The present disclosure relates to a rotary connector that can transmit an electrical signal or the like between a stationary body and a rotating body, and more particularly, to a rotary connector where a planetary gear is interposed between a stationary housing and a movable housing so that the stationary housing and the movable housing are rotatable relative to each other.

2. Description of the Related Art

A rotary connector is used in an automobile and the like to transmit an electrical signal or an optical signal or supply power between a stationary body and a rotating body. Specifically, when an air bag is provided in a steering wheel or switches used to operate an audio system and the like are provided on the steering wheel, electrical communication or the like needs to be performed between the steering wheel, which is a rotating body, and a vehicle that is a stationary body. For this purpose, a rotary connector is installed on the steering wheel.

A stationary housing, which is provided on the stationary body, and a movable housing, which is provided on the rotating body, of the rotary connector are disposed coaxially. An annular space portion is formed between an outer cylindrical body formed at the stationary housing and an inner cylindrical body formed at the movable housing, and a flat cable is wound and received in the annular space portion. Both end portions of the flat cable are connected to the stationary housing and the movable housing, respectively. When the movable housing is rotated as the rotating body is rotated, the flat cable is wound or unwound. Accordingly, the rotary connector maintains electrical connection between the stationary body and the rotating body, regardless of the rotation of the rotating body.

In such a rotary connector, it is possible to make the length of the flat cable, which is required to obtain the same rotatable range of the rotary connector, short by reversing the flat cable while winding the flat cable this type of rotary connector, there is a rotary connector disclosed in Japanese Unexamined Utility Model Registration Application Publication No. 6-50283.

A rotary connector where a flat cable is made short by reversing the flat cable employs a structure where an internal gear (outer gear) is formed at a stationary housing, a sun gear is formed at a movable housing, the internal gear and the sun gear face each other, a planetary gear meshing with both the internal gear and the sun gear is provided, and the planetary gear is provided with a reverse maintaining portion for maintaining a state where the flat cable is reversed.

However, in this case, a certain amount of backlash is required between the planetary gear and the internal gear and between the planetary gear and the sun gear in order to perform a smooth operation even in consideration of the deformation of the gears and the like. For this reason, since the gears collide with each other and rattle when the automobile vibrates and the like, rattling noises are caused.

SUMMARY

There is provided a rotary connector that includes a stationary housing and a movable housing. The stationary housing includes an outer cylindrical body and a bottom plate portion. The movable housing is disposed coaxially with the stationary housing and includes an inner cylindrical body facing the outer cylindrical body. An annular space portion is formed between the inner and outer cylindrical bodies facing each other and flat cables are wound and received in the annular space portion. An internal gear is provided on an inner surface of the stationary housing. A sun gear, which is disposed coaxially with the internal gear and faces the internal gear, is provided at the inner cylindrical body of the movable housing. A planetary gear, which meshes with the sun gear and the internal gear and rotates and revolves, is rotatably provided on the bottom plate portion. At least one of the planetary gear, the internal gear, and the sun gear includes a plurality of void portions in the circumferential direction.

DESCRIPTION OF THE EXEMPLARY EMBODIMENTS

Figure 1:
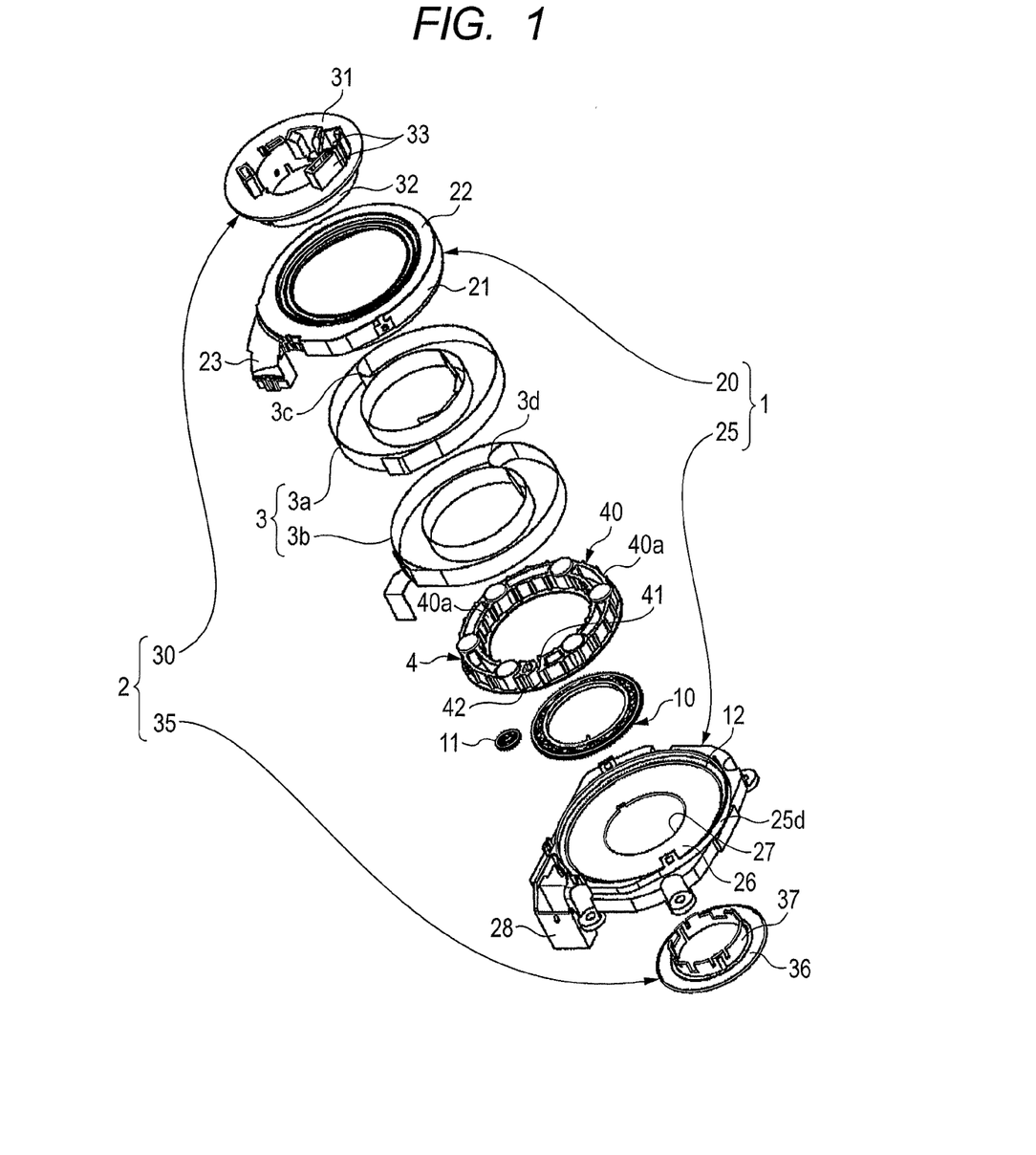
FIG. 1 is an exploded perspective view of a rotary connector according to an embodiment.
Figure 6:
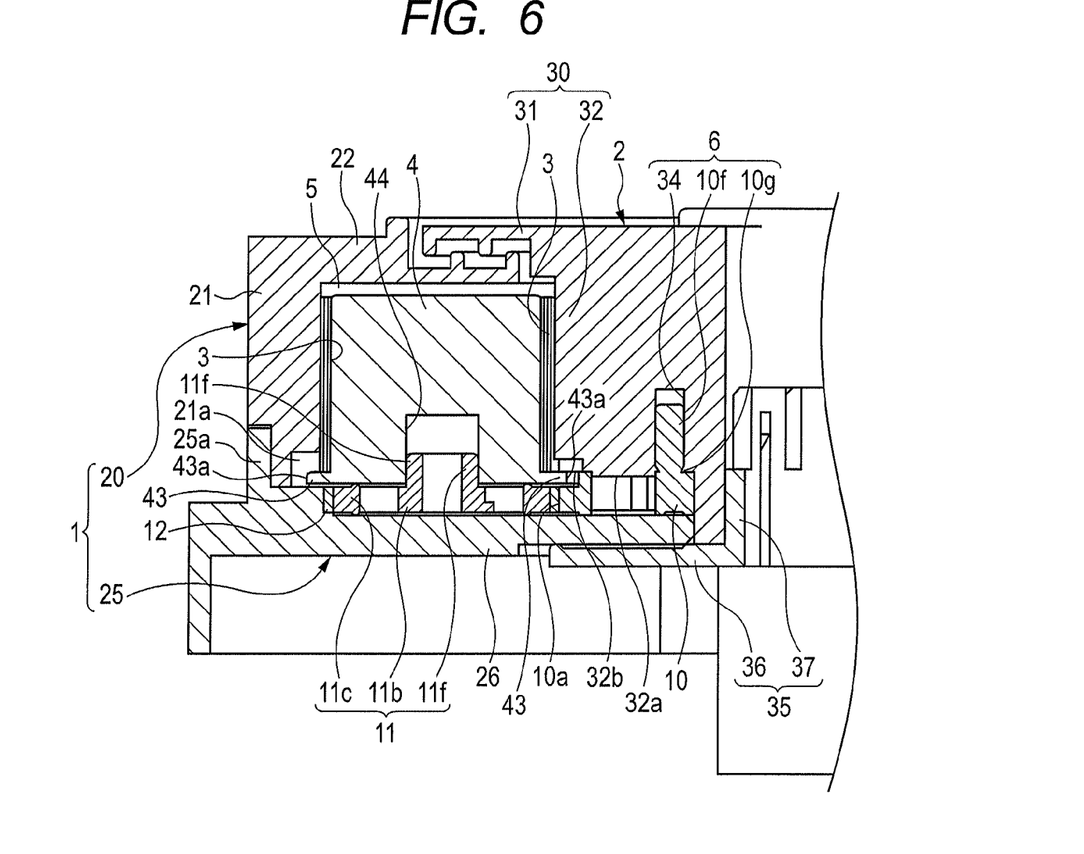
FIG. 6 is a cross-sectional view of a position, where the planetary gear is present, in a longitudinal cross-sectional view of the rotary connector.

An embodiment of the invention will be described in detail with reference to the drawings. FIG. 1 is an exploded perspective view of a rotary connector according to this embodiment. Further, FIG. 6 is a cross-sectional view of a position, where a planetary gear is present, in a longitudinal cross-sectional view of the rotary connector. The rotary connector according to this embodiment includes a stationary housing 1 that is fixed to a steering column part of an automobile, and a movable housing 2 that is rotated together with a steering wheel. Flat cables 3, which electrically connect the stationary housing with the movable housing, are wound and received in an annular space portion 5 (FIG. 6) formed between the stationary housing 1 and the movable housing 2.

An upper case 20 including an outer cylindrical body 21 and a lower case 25 including a bottom plate portion 26 are connected and integrated with each other by snap fitting or the like, so that the stationary housing 1 is formed. A ring portion 22, which has a substantially ring shape and protrudes inward from the upper end of the outer cylindrical body 21, is formed at the upper case 20. The ring portion 22 is integrally provided with an upper connecting portion 23 that protrudes outward from the outer periphery of the outer cylindrical body 21.

The lower case 25 is provided with a wall portion 25a that is erected from an outer edge portion of the bottom plate portion 26, and an internal gear 12 is formed on the inner peripheral wall of the wall portion 25a. A planetary gear 11 meshes with the internal gear 12, and meshes with a sun gear 10 that is provided in the movable housing 2. The structure of each of the gears will be described in detail below. The lower case 25 includes an opening 27 into which a steering shaft is inserted. The planetary gear 11 rotates and revolves on the inner surface of the bottom plate portion 26.

Further, a lower connecting portion 28, which is integrated with the upper connecting portion 23 when the lower case 25 and the upper case 20 are integrated with each other, is formed at the outer periphery of the lower case 25. The lower connecting portion 28 is provided with a connector (not shown) that electrically connects the flat cables 3 led out to a stationary side with a vehicle.

The movable housing 2 includes an upper rotor 30 and a lower rotor 35. The upper rotor 30 includes a ring-shaped top plate portion 31 that is positioned above the annular space portion 5, and an inner cylindrical body 32 that protrudes from the inner edge portion of the top plate portion 31 toward the bottom plate portion 26 of the lower case 25. The inner cylindrical body 32 is disposed coaxially with the outer cylindrical body 21, and faces the inner peripheral surface of the outer cylindrical body 21 with the annular space portion 5 interposed therebetween. Meanwhile, the lower rotor 35 includes a ring-shaped ring portion 36, and a cylindrical portion 37 that is erected from the inner edge portion of the ring portion 36.

The top plate portion 31 of the movable housing 2 includes movable-side connecting portions 33 that receive lead blocks (not shown) connected to the inner end portions of the flat cables 3. An external connector (not shown), which is connected to, for example, an air bag system, a horn switch circuit, and the like provided in a steering section, is connected to the lead blocks. Further, the cylindrical portion 37 of the lower rotor 35 inserted from the opening 27 of the lower case 25 is connected to the inner cylindrical body 32 of the upper rotor 30, which is inserted into the stationary housing 1, by snap fitting. When the upper rotor 30 and the lower rotor 35 are connected to each other as described above, the ring portion 36 of the lower rotor 35 comes into contact with the outer surface of the bottom plate portion 26 of the lower case 25 and the movable housing 2 is supported so as to be rotatable relative to the stationary housing 1.

The flat cables 3 are formed by covering conductor wires with a flexible resin film. In this embodiment, first and second flat cables 3a and 3b are received and wound in the annular space portion 5. The winding direction of the first flat cable 3a is reversed at a first reversed portion 3c, and the winding direction of a second flat cable 3b is reversed at a second reversed portion 3d.

The inner end portions of the respective flat cables 3 are fixed to the movable housing 2 and the outer end portions thereof are fixed to the stationary housing. Further, when the movable housing 2 is rotated relative to the stationary housing 1, the respective flat cables 3 are wound on the outer peripheral surface of the inner cylindrical body 32 is fed from the outer peripheral surface.

As shown in FIG. 6, a rotary ring body (reverse maintaining portion) 4 is disposed on the inner surface of the bottom plate portion 26 in the annular space portion 5. The planetary gear 11 is rotatably supported by the rotary ring body 4. Accordingly, when the movable housing 2 is rotated, the rotary ring body 4 is rotated as the planetary gear 11 rotates and revolves. Meanwhile, the rotary ring body 4 includes a ring-shaped main body portion 40. The rotary ring body 4 includes a first opening (reverse maintaining portion) 41 into which the first reversed portion 3c of the first flat cable 3a is inserted and a second opening (reverse maintaining portion) 42 into which the second reversed portion 3d of the second flat cable 3b is inserted, at different positions in the circumferential direction of the main body portion 40. For this reason, the reversed shapes of the first and second reversed portions 3c and 3d of the respective flat cables 3 are maintained by the first and second openings 41 and 42, regardless of the rotational position of the movable housing 2. Here, the main body portion 40 includes peripheral wall portions 40a that face the inner wall of the outer cylindrical body 21 and the outer wall of the inner cylindrical body 32. Meanwhile, as the reverse maintaining portions, for example, rotatable rollers, cylindrical bodies, columnar bodies protruding from the planetary gear 1, or the like may be applied other than the rotary ring body 4 and the first and second openings, and are disposed in the reversed portions (first reversed portions 3c and 3d) of the flat cables 3. Due to this structure, it is possible to stably maintain the shapes of the first and second reversed portions 3c and 3d of the flat cables 3 regardless of the rotation direction or rotation speed of the movable housing 2. Accordingly, hindrance such as the deformation of the flat cables 3 does not easily occur, so that it is possible to improve the quality and reliability of the rotary connector. Further, since a plurality of openings is formed, it is possible to easily wind a plurality of reversed flat cables 3 using a small number of members. As a result, it is possible to reduce costs.

Figure 7:
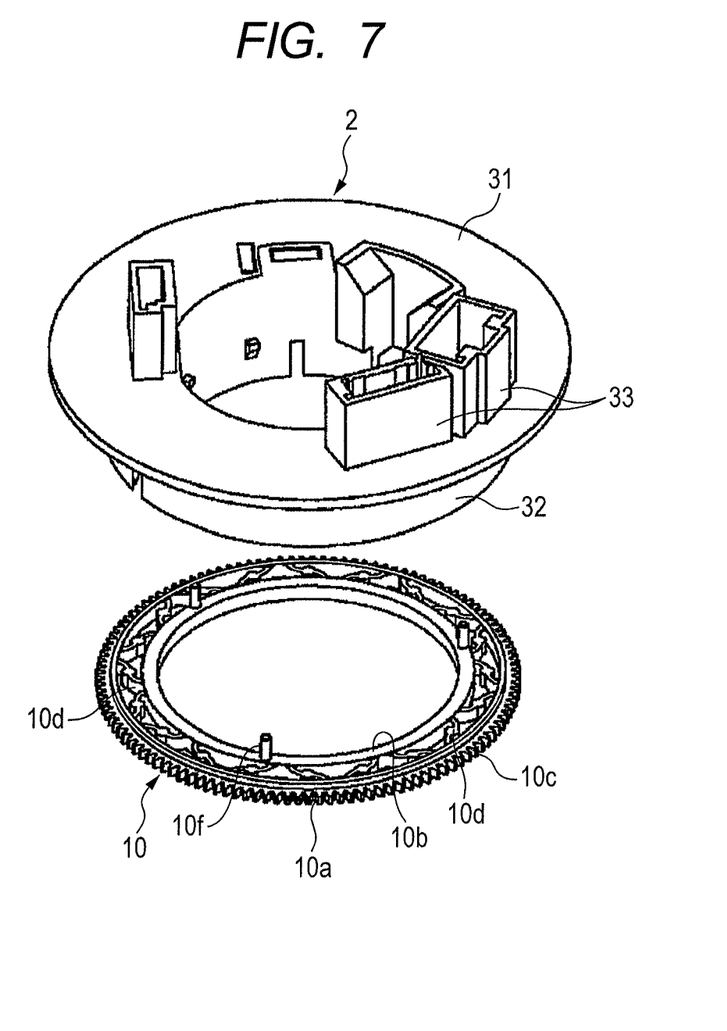
FIG. 7 is an exploded perspective view of a movable housing and the sun gear.

As shown in FIG. 6, the sun gear 10 is mounted on a first opposite surface 32a of the inner cylindrical body 32 of the movable housing 2 that faces the bottom plate portion 26 of the lower case 25. Meanwhile, the first opposite surface 32a will be described in detail below. FIG. 7 is an exploded perspective view of the movable housing 2 and the sun gear 10. A ring-shaped inside base 10b and a ring-shaped outside base 10c of the sun gear 10 are connected to each other by a plurality of connection portions 10d, and teeth 10a are formed on the outer peripheral surface of the outside base 10c over the entire circumference of the outside base 10c. When the movable housing 2 is supported so as to be rotatable relative to the stationary housing 1, the sun gear 10 faces the internal gear 12 of the stationary housing 1 in a radial direction.

Figure 2:
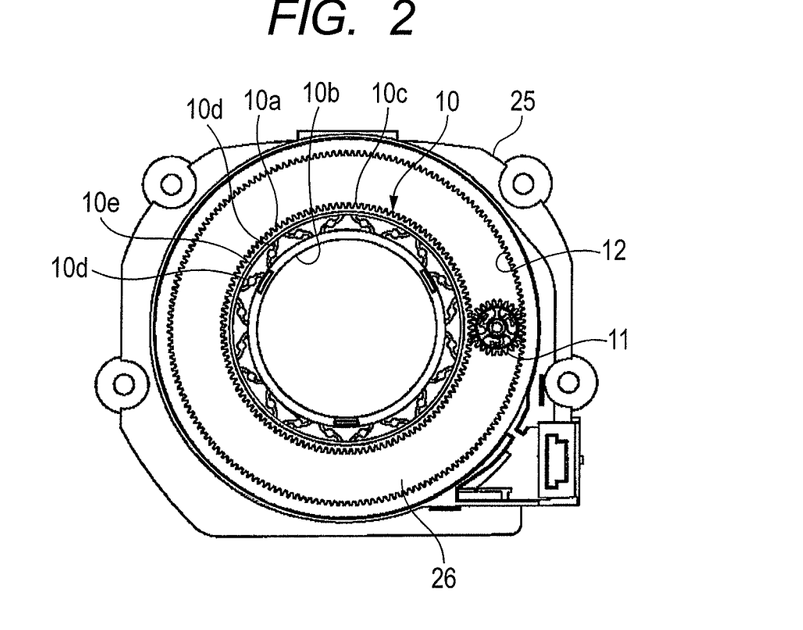
FIG. 2 is a plan view showing a state where gears are disposed.

FIG. 2 is a plan view showing a state where the respective gears are disposed. The planetary gear 11 meshes with the sun gear 10 and the internal gear 12 that are disposed coaxially. Accordingly, the planetary gear 11 revolves in the circumferential direction while rotating as the movable housing 2 is rotated. The rotary ring body 4 is rotated on the inner surface of the bottom plate portion 26 by the rotation and revolution of the planetary gear 11.

Figure 3:
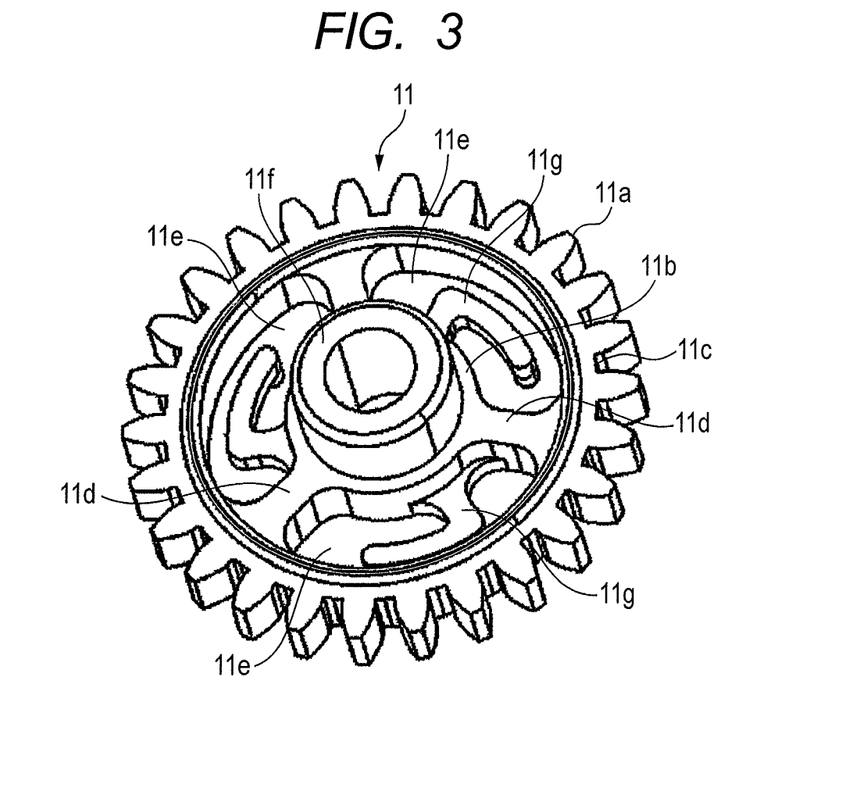
FIG. 3 is a perspective view of a planetary gear when seen from one side.
Figure 4:
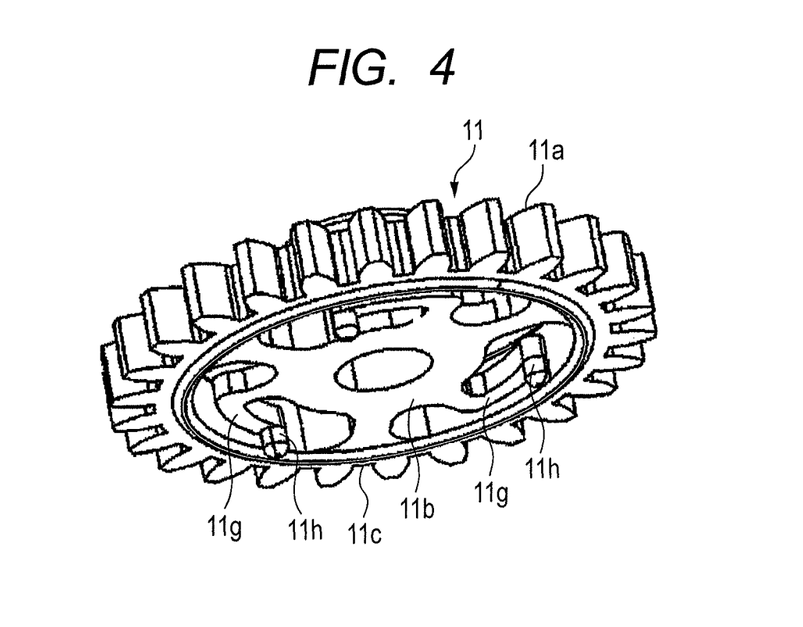
FIG. 4 is a perspective view of the planetary gear when seen from the other side.

The planetary gear 11 will be described in detail. FIG. 3 is a perspective view of the planetary gear 11 when seen from one side, and FIG. 4 is a perspective view of the planetary gear 11 when seen from the other side. As shown in FIG. 3, a ring-shaped inside base 1ib and a ring-shaped outside base 11c of the planetary gear 11, which are disposed coaxially with each other, are connected to each other by connection portions 1id extending in the radial direction. Three connection portions 11d are provided at the same angle so that a void portion 11e is formed between the connection portions 11d. Teeth 11a are formed on the outer peripheral surface of the outside base 11c over the entire circumference of the outside base 11c.

A protruding portion 11f protrudes from the inside base lib in the axial direction. The protruding portion 11f is rotatably mounted in a fitting recess 44 of the rotary ring body 4 (FIG. 6). When the planetary gear 11 rotates and revolves, the rotary ring body 4 is rotated in the annular space portion 5.

Further, elastic arm portions 11g, which extend toward the inside of the void portions lie, are formed at the inside base 11b. Each of the elastic arm portions 11g (elastic contact portions) is bent in the middle and extends in the circumferential direction. As shown in FIG. 4, a protrusion 11h is formed at the end portion of each of the elastic arm portions 11g so as to protrude downward in FIG. 4, that is, toward the bottom plate portion 26. Since the elastic arm portions 11g are formed in the form of a cantilever so as to be thinner than other portions of the planetary gear 11, the elastic arm portions 11g can be elastically deformed. In FIG. 6, the planetary gear 11 is disposed so that the elastic arm portions 11g (not shown) are bent. For this reason, the protrusions 11h receive resistance forces (reaction forces) from the inner surface of the bottom plate portion 26, so that elastic urging forces applied to the upper side in the axial direction is generated.

Meanwhile, since the plurality of void portions 11e are formed in the circumferential direction at the planetary gear 11 on the inner side of the teeth 11a, the planetary gear 11 can be elastically deformed in the radial direction. Since the plurality of void portions 10e are formed in the circumferential direction at the sun gear 10 between the respective connection portions 10d on the inner side of the teeth 10a as shown in FIG. 2, the sun gear 10 can be elastically deformed.

Figure 5:
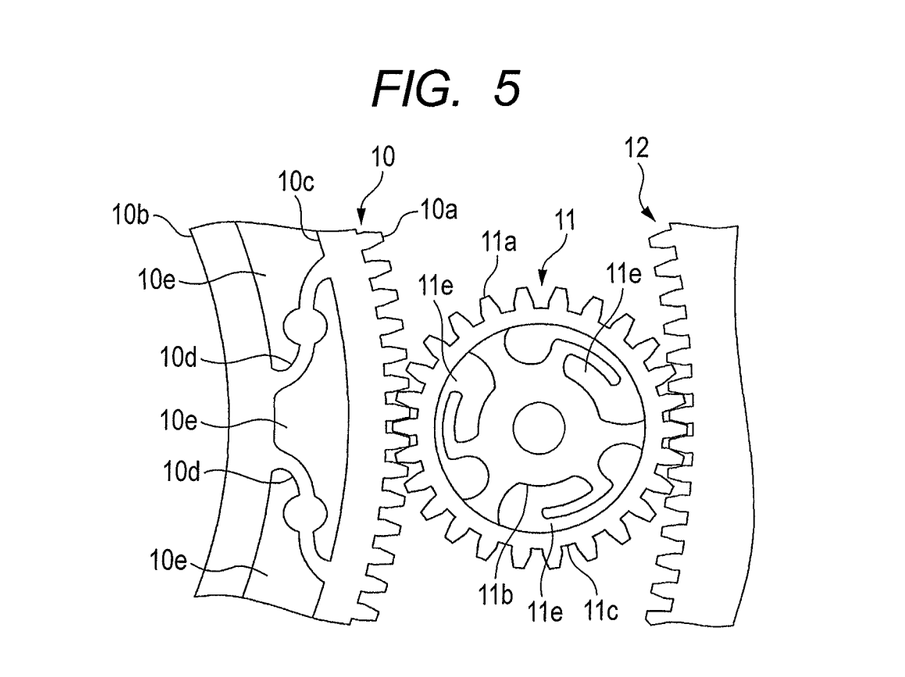
FIG. 5 is a schematic plan view showing a state where a deformed planetary gear, a sun gear, and an internal gear mesh with each other.

FIG. 5 is a schematic plan view showing a state where the planetary gear 11, the sun gear 10, and the internal gear 12 mesh with each other. A state where a distance between the sun gear 10 and the internal gear 12 reduced due to temperature changes and the like is shown in FIG. 5 so as to be exaggerated in comparison with an actual state.

Even in this state, the planetary gear 11 can be elastically deformed since the planetary gear 11 includes the void portions lie and the sun gear 10 can be elastically deformed since the sun gear 10 includes the void portions 10e. Accordingly, even though the amount of backlash between the planetary gear 11 and the sun gear 10 and between the planetary gear 11 and the internal gear 12 is set to zero, the respective gears can smoothly mesh with each other and be rotated. Therefore, since the respective gears smoothly mesh with each other in the plane direction without rattling even though the vehicle vibrates while traveling, it is possible to prevent rattling noises from being generated. Meanwhile, even though foreign materials penetrate between the planetary gear 11 and the sun gear 10 and between the planetary gear 11 and the internal gear 12, it is possible to avoid the generation of hindrance in the meshing and rotation of the respective gears by the elastic deformation of the planetary gear 11 and the sun gear 10. Further, in this embodiment, the plurality of void portions lie and 10e have been formed at the planetary gear 11 and the sun gear 10 so that the planetary gear 11 and the sun gear 10 can be elastically deformed. However, the void portions may be formed at any one of the gears. Furthermore, it goes without saying that void portions may be formed at the internal gear 12 so that all of the gears include void portions.

Moreover, the rotary ring body 4 is pushed up by the elastic urging forces generated by the elastic arm portions 11g, so that the planetary gear 11 is pressed against the first opposite surface 32a (inner cylindrical body 32). Accordingly, since the rotary ring body 4 does not rattle in the annular space portion 5 in the vertical direction even though the vehicle vibrates while traveling, it is possible to prevent rattling noises from being generated.

The structure of the rotary connector will be described. As shown in FIG. 6, in the annular space portion 5, the flat cables 3 are wound on the inner and outer peripheries of the rotary ring body 4, respectively.

First and second opposite surfaces 32a and 32b (contact surface portion), which face the bottom plate portion 26 (lower case 25), are formed at the lower portion of the inner cylindrical body 32, which corresponds to the outside in the radial direction, so as to have a difference in level therebetween. The first opposite surface 32a is formed on the inner side in the radial direction and the second opposite surface 32b is formed on the outer side in the radial direction. The sun gear 10 is mounted on the first opposite surface 32a as described above.

The rotary ring body 4 includes flange portions 43 that are formed at the lower end portion of the rotary ring body and protrudes inward and outward. Meanwhile, an inner edge portion 43a of the flange portion 43, which protrudes inward, is positioned inside the outer peripheral wall of the inner cylindrical body 32 in the radial direction. Meanwhile, an outer edge portion 43b of the flange portion 43, which protrudes outward, extends into an outer void portion 21a that is formed by a stepped portion formed at the lower portion of the outer cylindrical body 21, and is positioned outside the inner peripheral wall of the outer cylindrical body 21 in the radial direction. Accordingly, the flange portions 43 support the lower end portions of the respective flat cables 3. Further, since spaces in which the respective flat cables can move in the vertical and radial directions are reduced by the flange portions 43 and the above-mentioned peripheral wall portions 40a, it is possible to suppress rattling noise, which is caused by the collision between the respective flat cables and the respective inner surfaces of the ring portion 22 and the bottom plate portion 26, to a low level even though the vehicle vibrates in the vertical direction while traveling. Furthermore, since the inner edge portion 43a of the flange portion 43 always comes into elastic contact with the first opposite surface 32a due to the elastic urging forces of the elastic arm portions 11g, the planetary gear 11 and the rotary ring body 4 do not rattle in the vertical direction even though the vehicle vibrates while traveling. Therefore, it is possible to prevent rattling noises from being generated.

Since the respective gears smoothly mesh with each other without rattling as described above even though the amount of backlash between the planetary gear 11 and the sun gear 10 and between the planetary gear 11 and the internal gear 12 is set to zero, the rotary connector according to this embodiment can prevent rattling noises from being generated by the respective gears even though the vehicle vibrates while traveling. Moreover, since the rotary ring body 4 provided on the planetary gear 11 is urged in the axial and vertical directions by the elastic arm portions 11g, the inner edge portion 43a of the flange portion 43 always comes into elastic contact with the second opposite surface 32b. Accordingly, even though the vehicle vibrates in the vertical direction while traveling, the planetary gear 11 and the rotary ring body 4 do not rattle in the vertical direction and it is possible to prevent rattling noises from being generated.

Next, the mounting structure of the sun gear 10 will be described. As described above, the sun gear 10 is mounted on the first opposite surface 32a (FIG. 6) of the inner cylindrical body 32 (movable housing 2). As shown in FIG. 7, pin-shaped projections 10f are formed on the inside base 10b of the sun gear 10 so as to protrude in the direction of the rotation axis. The projections 10f are formed at three positions in the circumferential direction of the sun gear 10, and protrude so as to extend in the axial direction of the sun gear 10 and the inner cylindrical body 32. Recesses 34 are formed on the first opposite surface 32a of the inner cylindrical body 21 at three positions in the circumferential direction, and the projections 10f are fitted to the recesses 34.

Next, fixing release means 6 will be described with reference to FIG. 6. The fixing release means 6 includes the recesses 34 that are formed on the first opposite surface 32a (inner cylindrical body 32), the projections 10f of the sun gear 10, and notches 10g that are formed at the base portions of the projections 10f. The notch 10g is formed so as to cut into the base portion of the projection in the direction perpendicular to the axial direction of the sun gear 10. Further, the shape, depth, and the like of the notch 10g are set so that the notch 10g is fractured when a predetermined force is obliquely applied to the projection 10f. Accordingly, when a torsional load (torque), which is equal to or larger than a predetermined force, is applied between the sun gear 10 and the movable housing 2, the projections 10f are fractured at the notches 10g and the fixing between the sun gear member 10 and the movable housing 2 is released. Therefore, the movable housing 2 is rotatable relative to the sun gear member 10.

Therefore, even though the planetary gear 11 is locked due to the penetration of foreign materials or the like, the movable housing 2 is rotatable due to the fixing release means 6 and a steering wheel connected to the movable housing 2 is also operable. As a result, it is possible to avoid the danger of the operation of the steering wheel becoming locked.

The fixing release means 6 is not limited to the structure described in this embodiment. For example, projections may be formed instead of the recesses 34 of the movable housing 2 (first opposite surface 32a) and recesses may be formed instead of the projections 10f of the sun gear 10. Further, the recesses 34 and the projections 10f have extended in the axial direction in this embodiment, but may be formed so as to extend in the radial direction.

Figure 8:
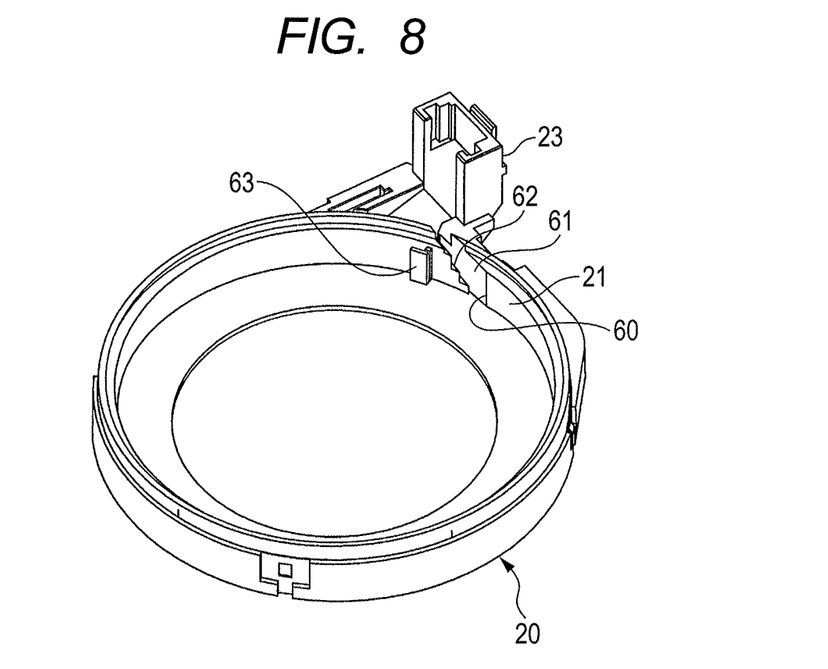
FIG. 8 is a perspective view of an upper case that forms a stationary housing.

Next, a cutting structure for the flat cables 3 will be described. A rotary connector where the movable housing 2 is not in the neutral position of rotation relative to the stationary housing 1 is rarely mounted on a steering wheel of an automobile. In this case, when the movable housing 2 is excessively rotated by the operation of the steering wheel, tooth skipping occurs where the planetary gear 11, the sun gear 10, and the internal gear 12 idle while not meshing normally with each other. For this reason, there is a concern that the movable housing 2 is rotated. When idle occurs, there is a problem in that a state where the movable housing 2 is not in the neutral position of rotation is further continued. In order to solve the above-mentioned problem, the rotary connector according to this embodiment is provided with a cutting structure that can reliably detect abnormalities by reliably cutting the flat cables 3. FIG. 8 is a perspective view of the upper case 20 that forms the stationary housing 1.

The upper case 20 includes the outer cylindrical body 21 as described above. A leading portion 60 is formed at the outer cylindrical body 21 so that the flat cable 3 is led to the annular space portion 5. The leading portion 60 is a guide passage 61 that makes the flat cable 3 be inserted into the wall surface of the outer cylindrical body 21.

Figure 9:
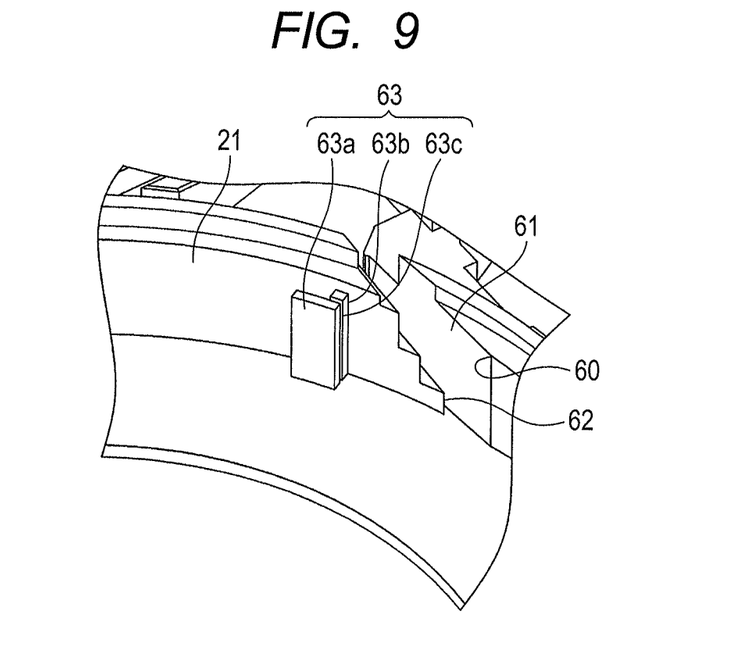
FIG. 9 is an enlarged view of the vicinity of a leading portion of FIG. 8.

FIG. 9 is an enlarged view of the vicinity of the leading portion 60 of FIG. 8. A fractured portion 62 is formed at a wall, which is disposed close to the annular space portion 5, of two walls, which face each other, of the guide passage 61 of the leading portion 60. Since the fractured portion 62 is formed stepwise, vertical side portions of the fractured portion are formed in the shape of a sharp cutter.

A holder 63 is formed near the fractured portion 62 on the inner wall of the outer cylindrical body 21. The holder 63 includes a guide wall portion 63a that is spaced apart from and faces the inner wall of the outer cylindrical body 21, a holding wall portion 63b that protrudes from the inner wall of the outer cylindrical body 21 toward the guide wall portion 63a, and an insertion portion 63c that is formed as a gap between the guide wall portion 63a and the holding wall portion 63b.

Figure 10:
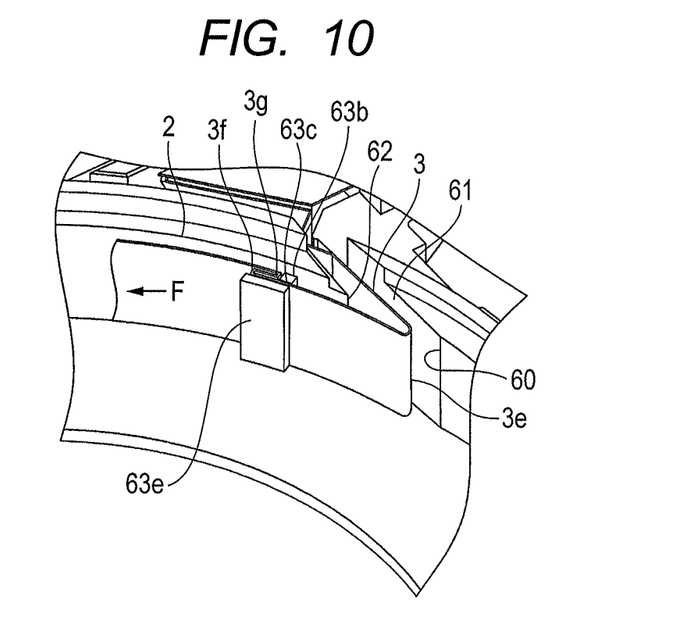
FIG. 10 is a perspective view showing a state where a flat cable is led to an annular space portion from the state shown in FIG. 9.

FIG. 10 is a perspective view showing a state where the flat cable 3 is led out to the annular space portion 5 from the state shown in FIG. 9. As shown in FIG. 10, the flat cable 3 is inserted into the guide passage 61 of the leading portion 60, is led into the annular space portion 5, is reversed there, and is wound in the annular space portion 5. A folded-back portion 3e, which is the reversed portion of the flat cable 3, faces the fractured portion 62 that is positioned inside the folded-back portion.

The flat cable 3, which is led into the annular space portion 5, is inserted into the insertion portion 63c of the holder 63, is along the guide wall portion 63a at the end thereof, is folded back at the folded portion 3f, and is folded back again at a folded portion 3g corresponding to a position where the flat cable bumps against the holding wall portion 63b. Accordingly, the end of the flat cable is disposed along the inner wall of the outer cylindrical body 21.

When the flat cable 3 is pulled by a force F due to the excessive rotation of the movable housing 2 in FIG. 10, a state where the flat cable is folded back at the holder 63 is released first if the force F is increased and reaches a holding force to be described below. After that, the folded-back portion 3e is pulled instantaneously. The folded-back portion 3e instantaneously collides with the fractured portion 62 at that time, so that the flat cable 3 is cut. The holding force of the holder 63, which holds the flat cable 3, is determined depending on the frictional force between the flat cable 3 and the guide wall portion 63a and the inner wall of the outer cylindrical body 21, the frictional force between the folded portions of the flat cable 3, the resistance force against deformation when the state where the flat cable 3 is folded back is released, and the like. Accordingly, the holding force is set according to the mechanical property of the flat cable 3, the number of times of folding of the flat cable, and the like.

Figure 11:
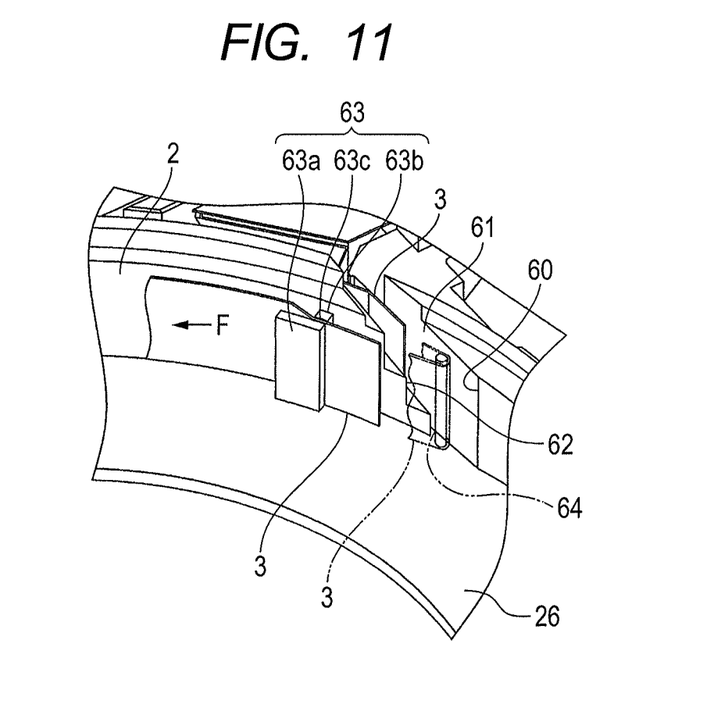
FIG. 11 is an enlarged perspective view showing a state where the flat cable is cut.

FIG. 11 is an enlarged perspective view showing a state where the flat cable 3 is cut. When the flat cable 3 is cut as shown in FIG. 11, electrical connection is completely disconnected. Accordingly, it is possible to reliably detect the cut of the flat cable as an abnormality during checking.

When the movable housing 2 is excessively rotated, it is necessary to set the following force relationship in order to reliably cut the flat cable 3 before the occurrence of the tooth skipping. If it is assumed that a force applied to the flat cable 3 when tooth skipping occurs is denoted by $F_1$, a force for holding the flat cable 3 at the holder 63 is denoted by $F_2$, and a force required to cut the flat cable 3 by the fractured portion 62 is denoted by $F_3$, a relationship of "$F_1 > F_2 > F_3$" is set.

When a force F, which is smaller than the force $F_1$ when tooth skipping occurs and larger than the force $F_2$ for holding the flat cable 3 at the holder 63, is applied to the flat cable 3, the holding of the flat cable 3 at the holder 63 is reliably released according to this force relationship. In this case, since a force, which is larger than the force $F_3$ required to cut the flat cable 3 by the fractured portion 62, is applied to the flat cable 3, tooth skipping does not occur and the flat cable 3 is reliably cut by the fractured portion 62. Meanwhile, when the force F applied to the flat cable 3 is smaller than the force F2 for holding the flat cable 3 at the holder 63, the holding of the flat cable 3 at the holder 63 is maintained. For this reason, the flat cable 3 is not cut by the fractured portion 62.

As described above, the relationship between the three forces is appropriately set by forming the holder 63 at the outer cylindrical body 21. Accordingly, the flat cable 3 is reliably cut when the excessive rotation of the movable housing, that is, an abnormality occurs, so that it is possible to detect abnormalities.

In the cutting structure, the configuration of the holder 63 is not limited to two walls of this embodiment. For example, the holder 63 may be formed so that two pin-shaped protrusions are formed near the outer cylindrical body 21 on the stationary housing 1 at different positions in the radial direction and the flat cable 3 is held by the holder by being folded back at these protrusions.

Further, instead of the configuration of the holder 63, in FIG. 11, a reversing pin 64 shown in FIG. 11 by a chain line may be erected on the bottom plate portion 26 at the front position of the fractured portion 62, a flat cable 3 shown in FIG. 11 by a chain line may be reversed around the reversing pin 64, and the reversing pin 64 may be set to be broken by a force $F_2$. In this case, the reversing pin 64 forms a cutting structure.

Furthermore, hole portions may be formed at the protrusions protruding from the inner wall of the outer cylindrical body 21; and the flat cable 3 may be inserted into the hole portions, and folded back, and wound in the annular space portion 15. In this case, when a force equal to or larger than a predetermined force $F_2$ is applied to the flat cable 3, the protrusions are broken.

The embodiment of the invention has been described above. However, the invention is not limited to this embodiment and may be applied in various ways without departing from the scope of the invention.

It should be understood by those skilled in the art that various modifications, combinations, sub-combinations and alterations may occur depending on design requirements and other factors insofar as they are within the scope of the appended claims of the equivalents thereof.

What is claimed is:

1. A rotary connector comprising:
a stationary housing that includes an outer cylindrical body and a bottom plate portion and a movable housing that is disposed coaxially with the stationary housing and includes an inner cylindrical body facing the outer cylindrical body, an annular space portion being formed between the inner and outer cylindrical bodies facing each other and flat cables being wound and received in the annular space portion,
an internal gear provided on an inner surface of the stationary housing,
a sun gear, which is disposed coaxially with the internal gear and faces the internal gear, provided at the inner cylindrical body of the movable housing,
a planetary gear, which meshes with the sun gear and the internal gear and rotates and revolves, rotatably provided on the bottom plate portion, and
wherein at least one of the planetary gear, the internal gear, and the sun gear includes a ring-shape outside base, an inside base disposed inside the outside base, teeth disposed on at least one of the ring-shape outside base and the inside base, a plurality of connection portions that connect the inside base to the outside base, and a plurality of void portions in a circumferential direction and disposed between the plurality of connection portions, respectively.

2. The rotary connector according to claim 1,
wherein a reverse maintaining portion, which supports the planetary gear so as to allow the planetary gear to be rotatable and maintains a state where the winding directions of the flat cables are reversed, is rotatably provided in the annular space portion.

3. A rotary connector comprising:
a stationary housing that includes an outer cylindrical body and a bottom plate portion and a movable housing that is disposed coaxially with the stationary housing and includes an inner cylindrical body facing the outer cylindrical body, an annular space portion being formed between the inner and outer cylindrical bodies facing each other and flat cables being wound and received in the annular space portion,
an internal gear provided on an inner surface of the stationary housing,
a sun gear, which is disposed coaxially with the internal gear and faces the internal gear, provided at the inner cylindrical body of the movable housing,
a planetary gear, which meshes with the sun gear and the internal gear and rotates and revolves, rotatably provided on the bottom plate portion, and
wherein at least one of the planetary gear, the internal gear, and the sun gear includes a plurality of void portions in a circumferential direction, and
wherein the reverse maintaining portion includes a rotary ring body that supports the planetary gear so as to allow the planetary gear to be rotatable and openings that are formed at the rotary ring body and reverse the flat cables.

4. The rotary connector according to claim 3,
wherein the planetary gear includes elastic contact portions that come into elastic contact with at least one of the bottom plate portion and the rotary ring body,
the rotary ring body includes flange portions that support lower end portions of the flat cables on the inside and outside of the rotary ring body in a radial direction, and
the inner cylindrical body includes contact surface portions that slide on the flange portions.

5. The rotary connector according to claim 4,
wherein the elastic contact portions are elastic arm portions that extend toward the inside of the void portions.

* * * * *